United States Patent

Silverstein

[15] 3,676,381

[45] July 11, 1972

[54] SEALANT FOR PNEUMATIC TIRES

[72] Inventor: Joseph J. Silverstein, Woodmere, N.Y.

[73] Assignee: Engine Power Corp., College Point, N.Y.

[22] Filed: Feb. 18, 1969

[21] Appl. No.: 800,254

[52] U.S. Cl. ............. 260/17.4 R, 260/17.4 CL, 260/17.4 SG
[51] Int. Cl. ................................. C08l 41/06, C08l 37/00
[58] Field of Search ................ 260/17.4 R, 17.4 ST, 17.4 SG

[56] References Cited

UNITED STATES PATENTS

| | | | |
|---|---|---|---|
| 2,057,882 | 10/1936 | Crowley | 106/22 |
| 2,336,065 | 12/1943 | Cadham | 102/42 |
| 2,419,614 | 4/1947 | Welch | 20/89 |
| 2,433,849 | 1/1948 | Lathrop et al. | 106/122 |
| 2,506,309 | 5/1950 | Middleman | 260/17.3 |
| 2,806,008 | 9/1957 | McNulty et al. | 260/17.4 |

*Primary Examiner*—Melvin Goldstein
*Attorney*—Brenner, O'Brien, Guay and Connors

[57] ABSTRACT

A self-sealing lining is provided in pneumatic tires which includes an aqueous blend of a blocking agent, a binding agent, an adhesive agent and a diluent.

2 Claims, No Drawings

SEALANT FOR PNEUMATIC TIRES

BACKGROUND OF THE INVENTION

This invention relates to self-sealing linings which can be used in rubberized containers. More particularly, this invention relates to self-sealing linings for pneumatic tires, tubes and the like. In another aspect, this invention relates to an improved method for sealing a puncture in a pneumatic tire.

Punctured inner tubes, and more recently, tubeless tires, have in the past been repaired by applying a rubberized patch to the damaged area. Such a repair process requires careful and skillful manipulations in applying the patch for satisfactory repair and the avoidance of subsequent partial or complete detachment of the patch. Moreover, in all patch repairs which are effected on resilient, hollow, pneumatic, containers, such as a motor vehicle tire, it is important that the patches be so positioned in the damaged area, for example a hole or puncture caused by the penetration of a nail or spike, that the thickest and strongest part of the main body of the patch be disposed over the actual damaged area. This is necessary to avoid excessive stress about the edge portions of the patch, made thin for specific reasons, and overstretching and in certain instances damage or detachment particularly under conditions involving considerable pressure such as, for example, the high pressures existing inside the inner tube of a heavy truck tire. Experience has demonstrated that even when all prescribed conditions are followed, overstressing of the patch frequently occurs, particularly when the patches are used to repair motor vehicle inner tubes. This is especially noticeable when the patch is applied at portions of the tube which when subsequently inserted in the tire casing are not subjected to counteracting pressures or are only subjected to slight pressure due to contact.

Accordingly, the present invention has for an object provision of self-sealing linings for pneumatic tires, tubes and the like which obviates the above disadvantages inherent in patching techniques and solves the problem therein of establishing a favorable compensation of tension between the middle portion of a patch, the edge of a patch, and the article being repaired.

Other objects and advantages of the instant invention as compared with prior art will become more apparent upon examination of the following more detailed disclosure.

SUMMARY OF THE INVENTION

According to the instant invention, inner tubes and tubeless tires can be provided with a self-sealing lining, which lining tends to flow into punctures or breaks in the wall or crown of the tire thereby preventing the escape of air. Tire puncture sealants of the instant invention are maintained sufficiently fluid, at all times, to flow around a penetrating object and follow the object into the puncture as the object, such as a nail or spike, is removed. This sealant material maintains its integrity and fluidity under all road conditions, including the higher temperatures encountered in summer driving. Furthermore, tire puncture sealants of the instant invention, when incorporated in a tire or tire tube, form a substantially uniform coating therein of fluid, tacky, sealing material that resists agglomeration while the tire is at rest for long periods of time and in an unpunctured condition.

Puncture sealants of the instant invention are incorporated in various types of inflatable rubber-lined objects by injectinG the sealant composition into said objects while in a deflated condition. Immediately after the sealant composition is injected into a rubber object, the object can be inflated to assume a functional posture. Although self-sealing linings of this invention can be applied to various types of inflatable rubber lined objects, their greatest advantages are in the application to pneumatic inner tubes and tubeless tires. The process of equipping pneumatic inner tubes and tubeless tire with the self-sealing linings of this invention comprises removing the valve assembly from the pneumatic inner tube or tubeless tire and deflating said tube or tubeless tire, injecting the sealant composition through the valve housing, replacing said valve assembly in said value housing, and inflating said pneumatic inner tube or tubeless tire for immediate use. Sufficient sealant composition is injected into the tube or tubeless tire to substantially coat the interior surface thereof, usually about eight ounces of said sealant composition is preferred.

The sealant compositions of use in the instant invention comprise in combination a blocking agent, a binding agent, an adhesive, and a diluent, mixed together in an aqueous blend.

DESCRIPTION OF PREFERRED EMBODIMENT

The blocking agent used in the instant composition is a mixture of wood chips and shredded paper. The wood chips, preferably of soft pine, must be less than 80 mesh, preferably about 100 mesh, while the shredded paper must be of a width less three-sixteenths inch, preferably about one-eighth inch.

The binding agent is an aqueous acrylic copolymer emulsion. Monomer which may be employed in the preparation of suitable copolymer include compounds such as butyl acrylate, ethyl acrylate, methyl methacrylate, methacrylic acid, styrene and vinyl acetate. A preferred acrylic copolymer is that obtained copolymerizing butyl acrylate, styrene and methacrylic acid; a more preferred acrylic copolymer is that obtained by copolymerizing ethYl acrylate, methyl methacrylate and vinyl acetate. Emulsions of these acrylic copolymers are formed by dispersing the resin in an aqueous system using suitable surface active agents or emulsifiers. Anionic emulsifiers may be employed for this purpose but it has been found that mixtures of anionic and nonionic emulsifiers are preferred to obtain optimum particle size and ease of reaction. Suitable emulsifiers in the instant invention include sodium dioctyl sulfosuccinate, nonylphenoxypoly (oxyethylene)-ethanol, etc. A feature of these aqueous emulsions is that they remain fluid and tacky at tire temperatures encountered under normal highway operating conditions, for example temperatures within the range of 140°–160° F.

When the pneumatic tire or tube is punctured, the binding agent and blocking agent cooperate to form an airtight seal over the damaged area. An adhesive agent is employed to firmly secure this seal to the rubber wall of said pneumatic tire or tube. It is, therefore, required that this adhesive be compatible with rubber and the binding agent. A suitable adhesive agent is found to be corn syrup.

The diluent employed in the instant invention acts as a carrier for the binding agent and causes said binding to retain its tacky consistency. Ethylene glycol is a preferred diluent and operates to maintain the binding agent in the necessary fluid and tacky state when the sealant composition is maintained in a closed container, for example, an inflated tire.

The following examples are provided to illustrate the instant invention more fully. They are provided for illustrative purposes only and are not to be construed as limiting the invention, which is defined by the appended claims. In the examples, all parts are by weight unless indicated to the contrary.

EXAMPLE 1

A sealant composition is prepared by admixing 950 parts of a 40 percent aqueous emulsion of ethyl acrylate-methyl methacrylate-vinyl acetate copolymer (commercially available from Emulsion Systems, Inc. under the trade name "Esicryl 0600"), 330 parts of 100 mesh soft pine wood chips, 15 parts shredded paper of ⅛-inch width, 300 parts of corn syrup, 600 parts of ethylene glycol, and 2,635 parts of water. Eight ounces of this sealant composition are injected into a deflated pneumatic tire, from which the valve assembly has been removed, through the valve housing aperture. The valve assembly is immediately replaced in its housing and the tire inflated to 30 pounds pressure.

The inflated tire is mounted on an automobile which is then driven at highway speed to develop normal tire operating temperature. The tire is then driven over and punctured by a ⅛-inch diameter nail. A seal is formed by the injected composition and the tire does not become deflated.

EXAMPLE II

A sealant composition is prepared as in Example I wherein a copolymer consisting of 60 parts butyl acrylate, 35 parts styrene and 5 parts methacrylate is substituted for said ethyl acrylate-methyl methacrylate-vinyl acetate copolymer. The composition is employed in a pneumatic tire in the manner illustrated in Example I and similar results are obtained thereby.

The composition of the above copolymer may be varied within the following range: butyl acrylate, 45–70 percent; styrene, 24–53 percent; methacrylic acid, 2–6 percent.

I claim:

1. A self-sealing composition which resists agglomeration and remains fluid and tacky at temperatures of 140° to 160° F., which composition comprises by weight an aqueous blend of a blocking agent comprising about 330 parts of 100 mesh soft pine wood chips and about 15 parts of shredded paper of about ⅛-inch width; about 950 parts of a binding agent, comprising an aqueous emulsion containing about 40 percent solids, said solids being an ethyl acrylate-methyl methacrylate-vinyl acetate copolymer; about 300 parts of adhesive comprising corn syrup; about 600 parts of diluent comprising ethylene glycol; and about 2,635 parts water.

2. A self-sealing composition which resists agglomeration and remains fluid and tacky at temperatures of 140° to 160° F., which composition comprises by weight an aqueous blend of a blocking agent comprising about 330 parts of 100 mesh soft pine wood chips and about 15 parts of shredded paper of about ⅛-inch width; about 950 parts of a binding agent, comprising an aqueous emulsion containing about 40 percent solids, said solids being a butyl acrylate-styrene-methacrylic acid copolymer; about 300 parts of adhesive comprising corn syrup; about 600 parts of diluent comprising ethylene glycol; and about 2,635 parts water.

* * * * *